June 10, 1969
C. A. TATE
3,448,719
IMPREGNATION APPARATUS
Filed Feb. 3, 1966
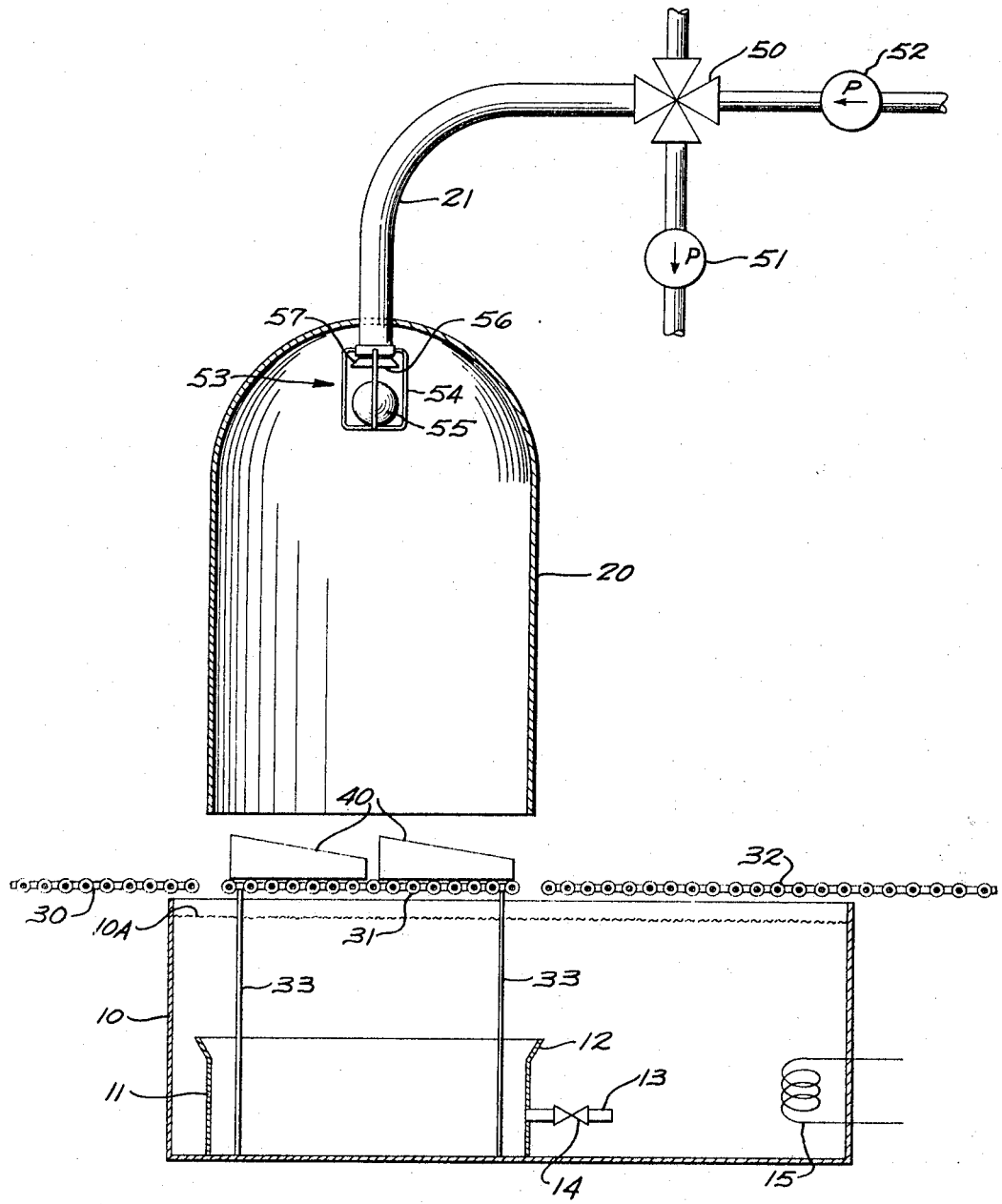
INVENTOR.
CARL A. TATE
BY
William C. Nealon
ATTORNEY

United States Patent Office

3,448,719
Patented June 10, 1969

3,448,719
IMPREGNATION APPARATUS
Carl A. Tate, Pittsburgh, Pa., assignor to Dresser Industries, Inc., a corporation of Delaware
Filed Feb. 3, 1966, Ser. No. 535,280
Int. Cl. C23c 13/08
U.S. Cl. 118—50                 1 Claim

ABSTRACT OF THE DISCLOSURE

Apparatus for impregnation of shapes comprising a bell shaped pressure vessel, an open topped vessel for containing impregnating material, means to enable a pressure fit between the open topped vessel and pressure vessel, means for positioning refractory shapes just above the impregnating material, a vacuum pump for exhausting the pressure vessel, and a pressure pump for pressurizing the pressure vessel.

---

The invention has particular application to impregnation of basic refractory brick suitable for use in lining vessels for the production of steel by the oxygen blowing process, variously referred to as the LD Process, the oxygen converter process, or, generally, as oxygen steelmaking.

The present process is applicable to substantially any type of refractory brick which one would desire to impregnate with a liquid, but it is particularly suited for impregnation of brick of the sort disclosed and claimed in United States Patents 3,106,475; 3,141,784; or 3,141,790. Preferred impregnation materials are selected from the class called "medium pitch" in the art. A discussion of this and other types of nonaqueous, cokable, carbonaceous materials conventionally used by those skilled in the art is found, for example, in United States Patent No. 3,070,449.

It has long been known to impregnate ceramically bonded shapes of one composition or another with various organic materials. The list of prior art impregnation materials is long, but the most commonly referred to material is coal tar. With the more viscous coal tars or equivalent pitch materials, there must be an initial heat treatment to render the material more fluid, thereby to facilitate penetration of brick. It has also been conventional to heat the brick prior to the impregnation step. Lacking such a heat treatment, coagulation occurs adjacent surfaces of the brick, and thorough impregnation is not obtained.

Further, even with heated brick and heated tar, it takes a long time to impregnate the brick when they were simply immersed in the impregnating material. Because of this difficulty, treatment has been affected in exhausted vessels to which heated impregnated material is admitted after charging the vessel with heated brick and subjecting the brick to a vacuum. By proper control of temperatures, selection of pitch material, etc., relatively rapid impregnation can be accomplished.

However, even though the prior art, as of this date, has provided commercially feasible processes for impregnation of brick, improvement is still to be desired. For example, even though the impregnation step, per se, can now be accomplished quite rapidly, auxiliary handling apparatus (for example, racks or pallets, conveyor belts, and the like) is susceptible to tar buildup. Thus, it is a primary object of this invention to provide a simplified process for the impregnation of brick, and, in particular, basic brick, which process requires utilization of a minimum of auxiliary apparatus for manipulation of brick, transfer of liquid tar, and manhandling of brick.

Briefly, according to one aspect of this invention, there is provided a system or arrangement of apparatus parts for the impregnation of ceramically bonded brick which is comprised of two main sections. The first section is a liquid-tar holding receptacle, and the second is a movable open-bottomed bell or dome. Positioned within the vessel containing the liquid tar is a collar arranged to selectively mate with and seal the bottom of the bell. A conveyor system is arranged to move brick above the level of liquid tar between the collar and the open bottom of the bell. In operation, brick are positioned beneath the bell, the bell is moved downwardly over the brick to seat in the collar, and then through suitable manipulation of valves a reduced pressure is induced in the bell and tar is drawn upwardly as a result of said vacuum or reduced pressure to impregnate the brick.

It is thought a better understanding of the features and advantages of the present invention will be more readily apparent to those skilled in the art by a study of the following detailed description together with reference to the drawing. This drawing is a schematic view of a preferred arrangement of apparatus parts for the practice of the invention.

As shown in the schematic drawing, one arrangement of apparatus parts suitable for practice of my invention is comprised of two main sections. The first section includes the open-topped vessel 10 containing a bath of liquid tar. The tar level is indicated by reference numeral 10A. Supported on the bottom of the vessel 10 is a collar 11 having an outwardly flared circumferential lip 12 at its top. Opening through a wall of the collar to communicate with the liquid tar is the valved inlet 13. The valve 14 in the conduit is suitably arranged for manipulation externally of the vessel 10. The valve can be manipulated either manually or automatically. Manual operation is probably the simplest, in which the valve stem is an elongated one which passes through a side wall of the vessel 10 is suitable heating apparatus 15 to maintain the tar in its liquid condition. I have schematically shown an electrical heating element, but equally satisfactory is a plurality of gas burners positioned beneath or about the vessel 10.

The second section is positioned about the first section and is comprised of the open-bottomed dome or bell 20. Opening through the top of the bell is the conduit 21. This conduit 21 is interconnected with a suitable three-way valve and pump means.

Positioned just above the liquid tar level 10A and between the open bottom of the bell 20 and the flared lip 12 of collar 11 is a conveyor arrangement. As I show it, it is comprised of three sections, 30, 31 and 32. The center section 31 is physically separated from the conveyor elements 30 and 32 in such a manner as to allow downward movement of the bell 20 to encapsulate the center section 31 and brick 40 supported thereon which are to be impregnated. The center conveyor section 31 is supported as by rods 33.

Thus, in operation, heated brick are moved along conveyor section 30 from a brick preheater to the center conveyor section 31. Valve 14 is closed and the bell 20 is moved downwardly over the brick on conveyor section 31 until the bottom of the dome seats in the collar 11 forming a pressure fit. The three-way valve 50 is then adjusted to interconnect the bell with the vacuum pump 51. A reduced pressure is thus induced in the bell 20 while at substantially the same time, evacuating entrapped air and other gases and vapors from the internal pore structure of the brick 40 on conveyor section 31. The valve 14 is then opened and the heated liquid tar is forced upwardly under the influence of atmospheric pressure above the normal liquid level 10A to just submerge brick 40. To speed up (or at least assure more thorough) impregnation the valve 14 can then be closed, the valve 50 manipulated to interconnect the bell 20 with a pressure pump 52, thereby exerting pressure on the tar within the bell, thereby forcing it more rapidly through the brick. The valve 50 is thereafter manipulated to open the dome 20 to the atmosphere, the valve 14 is opened and the tar again seeks its level 10A by flowing outwardly through conduit 13. The bell 20 is raised and the impregnated brick are moved to a cooler.

To prevent accidental surges of pressure and also, perhaps, tar from flowing through the pumps 51 and 52 and the valve 50, I further include the valve arrangement 53. This is of a conventional variety and includes a cage 54 within which is seated a ball 55. The opening 56 of conduit 21 about which the cage 53 seats includes a swaged lip 57 in which an arcuate surface area of the ball 55 can seat. Thus, sudden surges in pressure or too high a tar level in the bell 20 move the ball 55 to seat in the opening 56 thereby closing off the conduit 21.

I prefer to use a roller-type conveyor for both sections 30 and 31, but for section 32 I prefer that type made up of a plurality of knife-edged wheels arranged in aligned rows. Such an arrangement presents a minimum surface-to-surface contact with impregnated brick leaving conveyor section 31 and over section 32 on their way to a cooler. The cooler is not shown nor is the preheater prior to section 30, to maintain drawing simplicity. I, likewise, have omitted the apparatus which raises and lowers the bell 20. Preferably, I use a simple cable hoist. Of course, conduit 21 must be flexible or articulated in such a manner as to allow the raising and lowering of the bell 20.

The degree of reduced pressure or vacuum applied to the bell 20 is quite variable depending on such process parameters as porosity of the brick to be impregnated, permeability of the brick, viscosity of the tar or other impregnant, temperature of the brick and the tar, and the like. Thus, as little as, say, two inches of mercury may suffice using very hot brick and tar, which brick are of high porosity and permeability, or if one allows more time for brick immersion. On the other hand, 0.1 to 0.3 atmosphere is a practical range to run the impregnating cycle.

In any event, in the interests of a complete disclosure of the best mode now known for practicing my invention, for impregnating brick of the type disclosed and claimed in United States Patent No. 3,141,790, having a density of about 181 and a porosity of about 17%, I suggest about 0.2 atmosphere. The liquid tar is maintained at least about 100° F. above its softening point. Using a medium pitch of a softening point of about 155° F. (which I prefer), the tar or pitch would be maintained at about 255 and, preferably, about 285° F. It should have a viscosity of at least about 355 centipoises. The brick are heated to a temperature in the range 200–500° F., preferably about 300° F. The vacuum or reduced pressure is maintained in bell 20 for about one minute before tar introduction.

In an alternative sequence of process steps, after the one minute of reduced pressure the dome 20 is pressurized to about 90 p.s.i. for about one minute. An additional or alternative treatment step after the reduced pressure step requires elimination of the tar from the bell 20, closing of the valve 14, and a repressurization of the bell 20 to about 90 p.s.i., for about one minute. It should be understood, of course, that no pressurization at all is possible using the method and apparatus of my invention.

While in the foregoing drawings and descriptions I have described specific embodiments I do not wish to be limited precisely thereto. Any suitable means for receiving the pressure vessel which is shaped to enable a liquid tight fit may be used in place of the flared collar. While I have shown a conveyor, other suitable means can be used for positioning the shapes just over the surface. Functional equivalents of the valve in the collar, the three way valve on top of the pressure vessel, pressure and exhaust pumps are within the contemplation of this invention.

Having thus described the invention in detail and with sufficient particularity as to enable those skilled in the art to practice it, what is desired to have protected by Letters Patent is set forth in the following claims:

1. Apparatus for impregnation of shapes comprising:
    (a) a bell-shaped pressure vessel and means for raising and lowering the pressure vessel vertically;
    (b) an open topped vessel for containing liquid impregnating material positioned below the pressure vessel;
    (c) means for receiving said pressure vessel in its lowered position inside said open topped vessel, said receiving means shaped to enable a pressure fit with said pressure vessel;
    (d) means for positioning the shapes just above the liquid surface in position for impregnation;
    (e) means for opening the interior of said receiving means to the open topped vessel when the level of said impregnating material in the pressure vessel is being raised or lowered;
    (f) a vacuum pump for exhausting the pressure vessel and drawing said impregnating material thereinto;
    (g) a pressure pump for pressurizing the pressure vessel;
    (h) means for opening the pressure vessel to either the atmosphere, said vacuum pump or said pressure pump.

References Cited

UNITED STATES PATENTS

| | | | |
|---|---|---|---|
| 3,255,032 | 6/1966 | Grant et al. | 117—119 |
| 2,872,344 | 2/1959 | Mees | 117—168 |
| 2,792,214 | 5/1957 | Eusner et al. | 117—61 |

ALFRED L. LEAVITT, *Primary Examiner.*

M. F. ESPOSITO, *Assistant Examiner.*

U.S. Cl. X.R.

117—113, 119